United States Patent Office.

WILLIAM SIMON, OF BALTIMORE, MARYLAND, ASSIGNOR TO THE BALTIMORE CHROME WORKS, OF SAME PLACE.

MANUFACTURE OF BICHROMATE OF SODA.

SPECIFICATION forming part of Letters Patent No. 307,994, dated November 11, 1884.

Application filed June 3, 1884. (No specimens.)

*To all whom it may concern:*

Be it known that I, WILLIAM SIMON, of Baltimore city, State of Maryland, have invented certain new and useful Improvements in the Manufacture of Bichromate of Soda, of which the following is a specification.

Great difficulties have heretofore existed in the manufacture of bichromate of soda, because this salt does not crystallize so readily as bichromate of potash, and can therefore not be obtained in a sufficiently pure state to answer the purpose of the consumer. By adopting, however, the following method invented by me these difficulties are overcome.

The first step of the operation consists in the manufacture of neutral chromate of soda according to the well-known process of heating a mixture of finely-ground chrome-ore, lime, and either carbonate of soda or caustic soda in a reverberatory furnace until decomposition has taken place and the chromic oxide has been converted into chromic acid, which enters into combination with the soda present, forming neutral chromate of soda. This latter salt is removed from the insoluble lime and ferric oxide by washing the mass with water. The wash-liquor thus obtained contains chiefly neutral chromate of soda, and the difficulty above referred to is the conversion of this neutral salt into the bichromate of soda and its separation from the second salt formed by the action of any mineral acid on the soda, the addition of which acid is required to remove one-half of the soda of the neutral chromate of soda. In case sulphuric acid is used for the decomposition of the neutral chromate there is formed, beside the bichromate of soda, sulphate of soda, a salt which when crystallizing takes up ten molecules or fifty-six per cent. of water, which water, however, is not pure in this case, but contains large quantities of the bichromate of soda, the very salt which is to be separated by this crystallization. If hydrochloric acid be used in place of sulphuric acid, chloride of sodium is formed, a salt which is almost equally soluble in hot and cold water, and can therefore not well be separated from the bichromate of soda. Most other acids which might be used for the decomposition—such as nitric or acetic acid—are too expensive, and can for this reason not be considered.

There is nothing new in all that has been said above, but the invention which I have made is as follows:

Instead of adding an acid to the neutral chromate-of-soda liquor, and attempting the separation of the two salts formed either by crystallization or by precipitating one of the salts during the process of boiling down, I proceed as follows: The chromate-of-soda solution is evaporated to dryness, and the dry anhydrous chromate of soda thus obtained is now subjected to the action of either sulphuric or strong hydrochloric acid, and decomposition takes place, bichromate of soda and either sulphate of soda or chloride of sodium being formed at the same time. The small quantity of water present in either of the acids named and used for the decomposition is sufficient to dissolve the total quantity of the bichromate of soda, as it is soluble in less than its own weight of water, but dissolves comparatively little of either chloride of sodium or sulphate of soda. The latter salt, moreover, which crystallizes in the ordinary way of separation with fifty-six per cent. of water, containing often as much as thirty per cent. of bichromate of soda, separates in this case as an almost anhydrous salt, containing no chromate or bichromate. The semi-fluid mass thus obtained is a mixture of small crystals of either sulphate of soda or chloride of sodium with a concentrated solution of bichromate of soda. The separation of these substances cannot be effected by a common process of filtering or washing with water, which latter would act as a solvent upon the sulphate of soda or chloride of sodium, but has to be effected mechanically by means of a centrifugal machine. The liquid thus obtained, being an almost pure solution of bichromate of soda in water, is now sufficiently evaporated and allowed to crystallize, or it is evaporated almost to dryness, when the whole mass congeals on cooling; or it is evaporated until all water is expelled, and poured into suitable molds.

I claim as my invention—

1. The improvement in the process of manufacturing bichromate of soda, which consists in evaporating the solution of neutral chromate of soda to dryness before adding the sulphuric or hydrochloric acid, substantially as set forth.

2. The improvement in the process of manufacturing bichromate of soda, which consists in evaporating the solution of neutral chromate of soda to dryness and adding to the dry salt common sulphuric acid, whereby anhydrous sodium sulphate crystallizes out, substantially as set forth.

3. The process herein described of manufacturing bichromate of soda, which consists in evaporating a solution of neutral chromate of soda to dryness, and then decomposing it in this condition by a mineral acid, and then separating mechanically the concentrated solution of bichromate of soda from the anhydrous lye product, substantially as set forth.

WILLIAM SIMON.

Witnesses:
 THOS. J. FLUHARTY,
 G. E. REARDON.